(12) United States Patent
Schwartz et al.

(10) Patent No.: US 6,607,128 B1
(45) Date of Patent: Aug. 19, 2003

(54) OPTICAL ASSEMBLY FOR BARCODE SCANNER

(75) Inventors: Eric D. Schwartz, Skaneateles, NY (US); Edward B. Hubben, Skaneateles, NY (US); Brian L. Jovanvoski, Syracuse, NY (US); Vivian L. Hunter, Baldwinsville, NY (US); Melvin D. McCall, Homer, NY (US)

(73) Assignee: Welch Allyn Data Collection Inc., Skanetateles Falls, NY (US)

( * ) Notice: Subject to any disclaimer, the term of this patent is extended or adjusted under 35 U.S.C. 154(b) by 0 days.

(21) Appl. No.: 09/658,811

(22) Filed: Sep. 11, 2000

Related U.S. Application Data

(63) Continuation of application No. 09/111,467, filed on Jul. 8, 1998, now Pat. No. 6,119,939.

(51) Int. Cl.[7] .................................................. G06K 7/10
(52) U.S. Cl. .............. 235/454; 235/462.42; 235/462.43
(58) Field of Search ....................... 235/462.01–462.49, 235/454

(56) References Cited

U.S. PATENT DOCUMENTS

| | | | | |
|---|---|---|---|---|
| 3,718,761 A | * | 2/1973 | Myer | 235/462.39 |
| 5,291,009 A | * | 3/1994 | Roustaei | 235/462.42 |
| 5,296,689 A | * | 3/1994 | Reddersen et al. | 235/462.21 |
| 5,484,994 A | * | 1/1996 | Roustaei | 235/462.25 |
| 5,621,203 A | | 4/1997 | Swartz et al. | |
| 5,656,805 A | | 8/1997 | Plesko | |
| 5,777,314 A | | 7/1998 | Roustaei | |
| 5,783,811 A | | 7/1998 | Feng et al. | |
| 5,811,784 A | | 9/1998 | Tausch et al. | |
| 5,814,803 A | | 9/1998 | Olmstead et al. | |

FOREIGN PATENT DOCUMENTS

| | | |
|---|---|---|
| DE | 24 45727 A1 | 4/1976 |
| EP | 0 431 831 A1 | 11/1990 |
| EP | 0 548 951 A2 | 12/1992 |
| EP | 0 944 017 A2 | 9/1999 |

* cited by examiner

*Primary Examiner*—Michael G. Lee
*Assistant Examiner*—Jamara A. Franklin
(74) *Attorney, Agent, or Firm*—Wall Marjama & Bilinski LLP

(57) ABSTRACT

The invention is optical assembly for use in a barcode reader that includes a frame having a rear housing and a pair of arms outwardly extended from the housing. An optical card containing an imaging lens is slidably received in a rear guideway situated between the arms. An aperture card is slidably received in a front guideway situated between the arms in front of the lens. Lamp support brackets are also mounted to either side of the arms. Each bracket contains a pair of LEDs that are aligned in coplanar relation with the imaging lens. A cylindrical lens is mounted in front of the lamp support brackets within the arms of the frame to magnify and focus the illumination from the LED upon a target in barcode space. A horizontally extended field stop aperture is positioned in front of each LED.

33 Claims, 3 Drawing Sheets

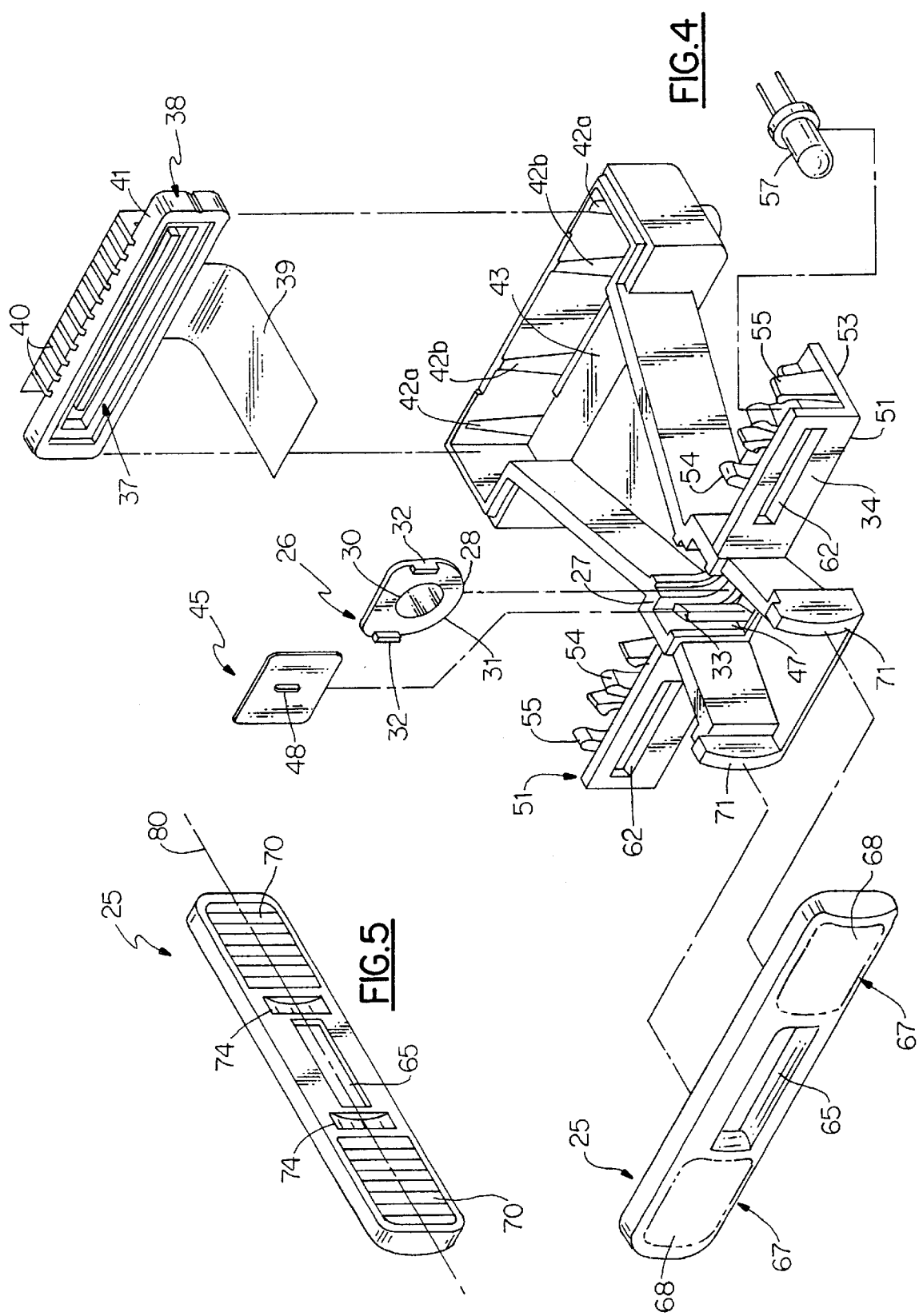

OPTICAL ASSEMBLY FOR BARCODE SCANNER

This is a continuation of application Ser. No. 09/111,476, filed Jul. 8, 1998 now U.S. Pat. No. 6,119,939.

BACKGROUND OF THE INVENTION

This invention relates to an optical assembly for use in a barcode reader and, in particular, to an optical assembly that is capable of maximizing the light produced by a plurality of light emitting diodes to provide a high intensity image of a barcode target at the image recording surface of a solid state imager.

Although the advantages associated with light emitting diodes (LEDs) when used in barcode scanning equipment are well known, the level of the intensity produced by this type of lamp is relatively low when compared to other light sources such as halogen lamps or arc lamps. In an effort to improve the effectiveness of light emitting diodes in this application, it is sometimes customary to employ a relatively large number of lamps aligned in one or more rows above or below the imaging lens. As a result, the target region, as well as the periphery of the target region, are flooded with an excessive amount of light. This approach, however, is space consuming and poses certain assembly and alignment problems.

Optical units have also been devised for providing coplanar illumination wherein the light emitting diodes are mounted in the same plane as the imaging onto both sides of the imaging lens. The light from the light emitting diodes is further passed through magnifying lens to project the light onto the target region. Additionally, diffusers are used in association with the LEDs to more uniformly distribute the light within the target area. Here again, these optical units overcome many of the problems associated with LED illumination systems. They nevertheless pose certain other problems relating to bringing the components together in assembly to provide a compact, easy to install and adjust unit suitable for use in a hand-held long range scanner as opposed to a scanner that reads barcodes in contact.

SUMMARY OF THE INVENTION

It is, therefore, a primary object of the present invention to improve barcode readers.

A further object of the invention is to improve hand-held barcode scanners for long range illumination and reading of a barcode target.

A still further object of the present invention is to improve optical devices for use in barcode scanners which are capable of producing a sharply defined line of illumination in barcode space using light emitting diodes.

Another object of the present invention is to simplify the assembly of barcode readers using coplanar light emitting diode illumination systems.

Yet another object of the present invention is to provide a single molded frame for holding and positioning the components of a barcode reader.

Yet a further object of the present invention is to more effectively utilize the light emitted by LEDs in a barcode scanner.

These and other objects of the present invention are attained by means of an optical assembly for use in a barcode reader that includes a molded support frame having a rear housing and a pair of arms outwardly extending from the front of the housing. A solid state imager is contained in the housing and an imaging lens is slidably contained between the arms in a rear guideway for focusing an image in barcode space along an optical axis onto the image recording surface of the solid state imager. An aperture card is also slidably contained between the arms in a second front guideway. The aperture card has a vertically disposed stop aperture which is centered about the optical axis of the system. A lamp support unit is mounted on the arms on either side of the imaging lens. Each unit contains a pair of light emitting diodes that are in coplanar alignment with the imaging lens and a horizontally disposed field aperture positioned in front of the light emitting diodes. A single horizontally extended half cylinder optical element is mounted at the distal end of the two arms so that the optical element is centered upon the optical axis of the system with the piano surface facing the imaging lens in perpendicular alignment with the optical axis. An opening is formed in the center of the optical element through which an image of a barcode target can pass optically undisturbed. The outer ends of the optical element form cylindrical lenses for magnifying and focussing the light passing through the two stop apertures in barcode space. A single axis diffuser is positioned at the piano surface of each cylindrical lens which distributes the light from the LEDs horizontally and homogenizes the light across the barcode target area.

BRIEF DESCRIPTION OF THE DRAWINGS

For a better understanding of these and other objects of the present invention, reference will be made to the following detailed description of the invention which is to be read in association with the accompanying drawings, wherein:

FIG. 4 is a slightly enlarged exploded view in perspective of the present optical assembly; and FIG. 5 is a perspective view showing the back of the half cylinder element.

DESCRIPTION OF THE INVENTION

Figure 1:
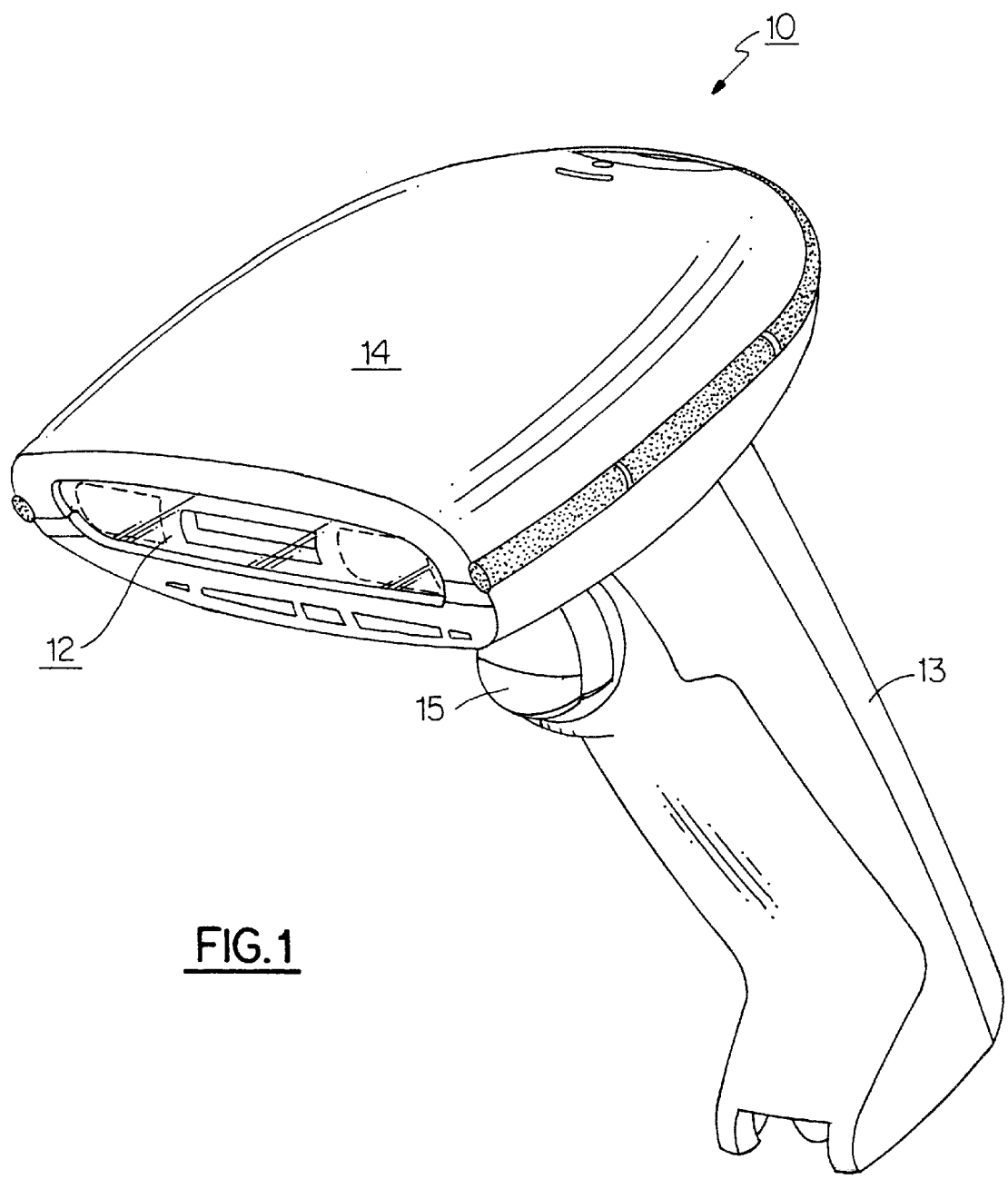
FIG. 1 is a perspective view of a hand-held barcode reader housing the optical assembly of the present invention.
Figure 2:
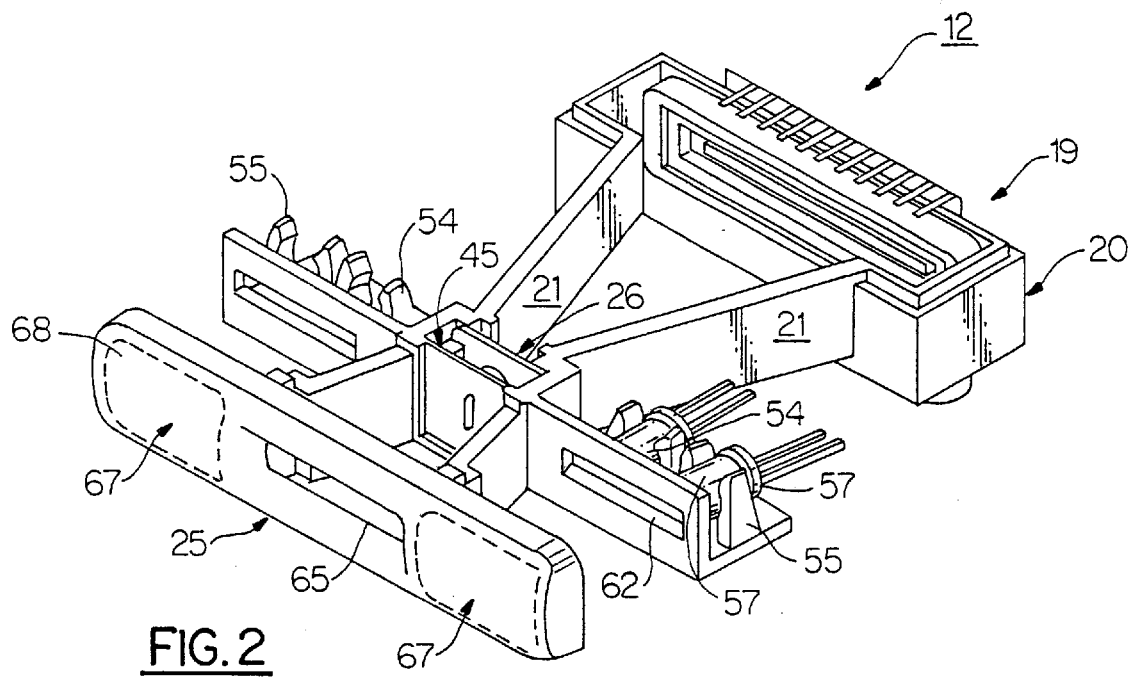
FIG. 2 is an enlarged perspective view showing the optical assembly encompassing the teachings of the present invention.

Turning initially to FIG. 1, there is shown a hand-held long-range barcode scanner 10 that houses the optical assembly 12 of the present invention. The scanner includes a handle 13 that can be easily grasped and held by the user so that the scanner can be rapidly trained upon a barcode target situated some distance from the user. The scanner further includes a contoured reader head 14 mounted on the top of the handle and a trigger 15 for activating the scanner. The scanner preferably is a light-weight, truly portable device that can be easily held and carried about without tiring the user. Accordingly, the reading components of the instrument must be compact, yet easily assembled, aligned and installed within the reader head. As will be explained in detail below, the apparatus of the present invention provides all these advantages while at the same time, delivering an extremely sharp, well-defined line of illumination in barcode space that can be accurately read by a solid state imager.

Figure 3:
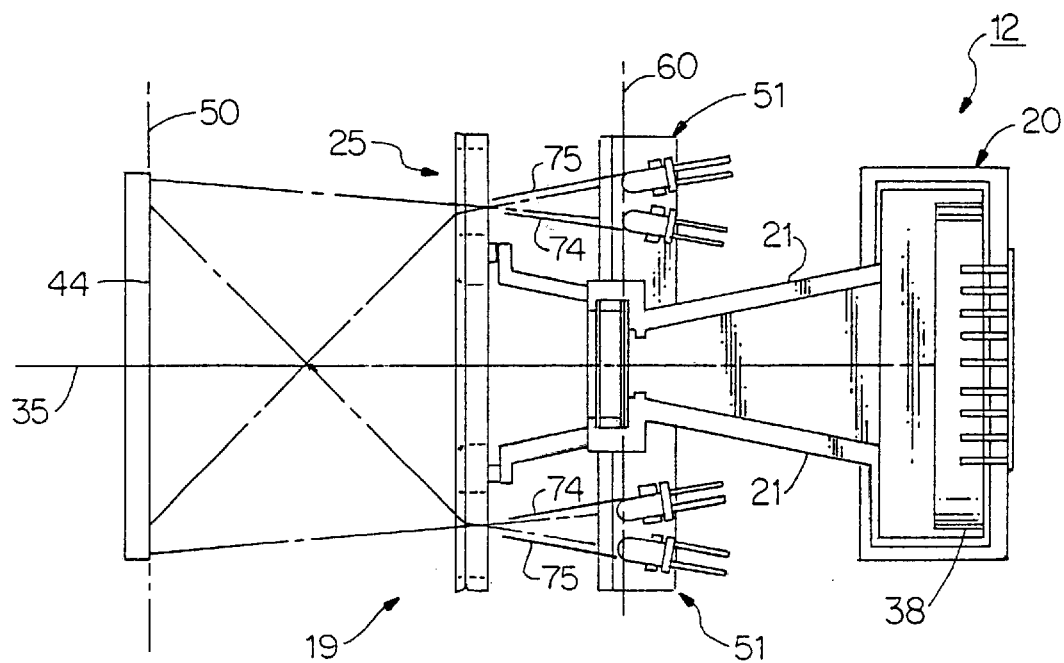
FIG. 3 is a top plan view of the optical assembly illustrated in FIG. 2.

With further reference to FIGS. 2–5, the optical assembly 12 embodying the teachings of the present invention includes a single piece frame 19 molded from high strength light-weight plastic. The frame further includes a rectangular-shaped housing 20 and a pair of forwardly extended arms 21—21. The arms, as viewed from above, in FIG. 3 are in an X configuration with an elongated optical element 25 mounted at the distal end of the arms, the function of which will be explained in greater detail below.

A lens card 26 (FIG. 4) is slidably received within a vertically disposed guideway 27 located at the neck formed by the arms. The lens card is molded from a single material and includes a flat lens holder 28 surrounding a single imaging lens 30. The bottom surface 31 of the holder is arcuate-shaped and adapted to seat within a complimentary groove situated in the bottom of the guideway. A pair of tabs 32—32 are carried on the front face of the lens holder which, in assembly, rests on the top surface of stanchions 33, which form the front rails of the guideway. The tab serves to locate the imaging lens within the frame and prevents the lens card from being, inserted into the frame in an inverted position.

Once properly mounted in the frame, the imaging lens defines the optical axis 35 (FIG. 2) of the system. A solid state within a support 38 and is coupled to a flexible ribbon connector 39 by a series of leads 40 mounted along the top apron 41 of the support. The support is passed downwardly into the housing against spaced apart locating ribs 42a and 42b molded into the back wall of the housing, and is seated upon the floor 43 of the housing. When the imager assembly is received by the back wall, it is seen that receiving surfaces of outer ribs 42a receive outer regions of a back surface of support 38 while receiving surfaces of inner ribs 42b receive a middle region of a back surface of support 38. The solid state imager is aligned within the housing so that it is centered upon the optical axis of the system a given distance from the imaging lens so that an image of a target 44 in barcode space is focused upon the image recording surface of the imager by the imaging lens. A system for mounting an image sensor in an imaging device is described in detail in a application Ser. No. 09/112,028 (now U.S. Pat. No. 6,275,388) entitled "Image Sensor Mounting System" filed Jul. 8, 1998, assigned to the Assignee of the present invention, and incorporated herein by reference.

An aperture card 45 is slidably contained within a second guideway 47 positioned in front of the first guideway at the neck of the "X" shaped arms. The aperture card contains a vertically-extended stop aperture 48 that is centered upon the horizontal optical axis of the system. When the card is mounted in the guideway, the vertical oriented long dimension of the aperture is arranged so that the long dimension is parallel to the longer dimension of a one-dimensional (1D) barcode target situated in the object plane 50 of the imaging lens.

The terms horizontal and vertical are used herein with respect to relative locations of various components of the optical system and not necessary as to the exact location of the components in space.

A pair of lamp brackets 51—51 are mounted on either side of the frame at the neck. Each bracket is of similar construction and includes a platform 53 and a front wall 54. As best illustrated in FIG. 4 each platform has a pair of clips 54 and 55 mounted thereon that are perpendicularly aligned with the optical axis of the system. A light emitting diode (LED) 57 is mounted in each clip so that the distal end of each lamp lies substantially within the plane 60 (FIG. 3) described by the imaging lens to furnish the system with what is known as coplanar illumination.

The front wall 34 of each lamp bracket contains a horizontally disposed field stop 62 that is positioned immediately in front of the LEDs preferably almost in contact with the lamps. Body portions of LEDs 57 of each bracket define inner and outer boundary lines 74 and 75. It is seen that LEDs 57 are disposed so that boundary lines 74 and 75 of each bracket extend through aperture 62.

The elongated optical element 25 mounted at the distal end of the frame arms is shown in greater detail in FIGS. 4 and 5. The optical element is formed of an elongated semi-circular shaped piece of optical glass having a rectangular-shaped opening 65 centrally formed therein. The opening is of a size and shape such that an image of a target in barcode space can freely pass optically undisturbed as it moves along unfolded receive the optical axis 35 of the system.

Cylindrical lens elements 67—67 are located on either side of the opening through which illumination from the LEDs pass. Each cylindrical lens images the field stop in barcode space to produce a sharp horizontal line of illumination at the target. A single axis diffuser 70—70 is located at the plano light entrance face of each cylindrical lens, which serve to homogenize the light in a horizontal plane and thus causes the light energy to be uniformly distributed within the target area. The diffuser can be either a gradient or a non-gradient diffuser. Preferably, a gradient diffuser is employed having 5° of diffusion at its outer edge, and 40° of diffusion at its inner edge.

The LEDs mounted in the inboard clips 54 of each lamp bracket is canted at an angle with respect to the optical axis so that the light beam from the lamps is directed to one outer side edge of the target region. The lamps mounted in the outboard clips 55 are similarly canted to direct the light beams from the outboard lamps toward the center of the target region. The positioning of the lamps along with the use of a single axis diffuser and a field stop apparatus serves to create a sharp uniform line of light across the barcode target that can be accurately recorded by the CCD imager.

As illustrated in FIG. 4, the distal end of each arm of the frame contains an arcuate-shaped camming surface 71 that lies in a vertical plane that is parallel with the optical axis of the system. The camming surfaces are received in complimentary cut-outs 74 formed in the plano back surface of the optical element 25 with the cut-outs being centered upon the center line of 80 of the optical element 25. Preferably, each camming surface describes arc segments of a circle about which the cylindrical illumination lenses carried by the elongated optical element 25 can be rotatably adjusted within the plane described by the arc segments. The center of curvature of the camming surfaces are coincident with the center of curvature of the front surface 68 of the optical element 67. Accordingly, the illuminator lenses can be adjusted about the arc segments so that the line of illumination that is produced is coincident with the object plane of the imaging lens. As can be seen, a slight rotation of the element about the camming surface will angularly offset the plano entrance face of the two cylindrical lenses with respect to the axis of the incoming light beam, thus altering the position of the line of light produced in the plane of the barcode target. Accordingly, during assembly of the optical reader components on the frame, the line of illumination can be easily and accurately adjusted in barcode space. Once adjusted the optical element is permanently locked in place by ultrasonically welding the optical element to the frame. Any other means for holding the optical element 25 in a desired position within the frame may be similarly employed without departing from the teachings of the present invention.

One example of an optical assembly suitable for use in a barcode reader involves a single element plastic lens having a focal length of approximately 30 mm.

The lens is positioned approx 39 mm in front of a linear array CCD, so an image of a target in barcode space is formed at the image plane of the lens at a magnification of approx 1/3.5×. The aperture stop of the lens can be either elliptical or rectangular in shape, having an aspect ratio of at least 3:1 and preferably 6.0 or 8:1. The longer dimension of the aperture is oriented vertically, so the long dimension of the aperture is parallel to the longer dimension of a ID barcode. The CCD of choice is a chip developed specifically for barcode reading, the photosensitive elements (pixels) having a 25:1 aspect ratio. Again, the longer dimension of the pixels will be aligned parallel to the barcode.

The illumination system consists of four LEDs in standard T 13/4 packages. Two LEDs will be arrayed on either side of the imaging lens. The LEDs will lie in the same plane as the imaging lens, to provide coplanar illumination. In front of the LEDs, almost in contact with them, is a field stop. The field stop is simply a horizontal slit having a height of about=0.040 to 0.050". The field stop is imaged into barcode space by a cylindrical lens having a focal length of about 25 mm. The magnification of the cylinder lens is approx 6×, so the result is a sharp horizontal line, 0.24" to 0.36" in height. Also included in the illumination system is a single axis diffuser, located in contact with the cylinder lens. This diffuser serves to homogenize the light in the horizontal plane, improving the uniformity of the distribution of the light.

While this invention has been explained with reference to the structure disclosed herein, it is not confined to the details set forth, and this invention is intended to cover any modifications and changes as may come within the scope of the following claims:

What is claimed is:

1. An optical assembly for use in an optical reader, said optical assembly comprising:
   a support frame having a rear housing containing a solid state imager assembly comprising an imager, an imager support, and a series of leads, wherein said rear housing includes a back surface receiving said solid state imager assembly;
   said support frame further including a pair of wall-shaped arms extending forwardly from said rear housing;
   an imaging lens assembly received between said wall-shaped arms;
   a pair of lamp brackets disposed at either side of said frame;
   at least one light emitting diode (LED) carried by each of said lamp brackets, said at least one LED defining inner and outer LED boundary lines; and
   a field stop disposed forward of said at least one LED, such that light from said at least one LED passes through said field stop prior to reaching a target barcode,
   wherein said at least one LED is disposed so that said boundary lines extend without interruption through said field stop.

2. The optical assembly of claim 1, wherein each of said pair of lamp brackets includes a platform carrying a pair of LED clips.

3. The optical assembly of claim 1, wherein each of said pair of lamp brackets includes a platform carrying a pair of LED clips and a front wall including an aperture defining the field stop.

4. The optical assembly of claim 3, wherein said aperture defining the field stop has at least one dimension in the range of about 0.040 inches to about 0.050 inches.

5. The optical assembly of claim 1, wherein said solid state imager support includes a back surface including a pair of outer spaced apart receiving surfaces for receiving outer regions of said back surface of said imager support.

6. The optical assembly of claim 1, wherein said imaging lens assembly comprises a lens card.

7. The optical assembly of claim 6, wherein said lens card includes a flat lens holder surrounding a single imaging lens.

8. The optical assembly of claim 7, wherein said single imaging lense is shaped to have an aspect ratio of between 3:1 and 8:1.

9. The optical assembly of claim 7, wherein said single imaging lens is positioned approximately 39 millimeters away from said solid state imager assembly.

10. The optical assembly of claim 1, wherein each of said lamp brackets carries two LEDs.

11. The optical assembly of claim 10, wherein each LED includes a pair of electrically conductive prongs extending therefrom.

12. The optical assembly of claim 1, wherein said imager is a charge coupled device (CCD).

13. The optical assembly of claim 1, wherein said series of leads are electrically connected to a flexible ribbon connector.

14. The optical assembly of claim 1, wherein said series of leads comprise a plurality of pins.

15. The optical assembly of claim 14, wherein said series of leads comprises between eleven and twenty-two pins.

16. The optical assembly of claim 1, wherein said support frame is molded from plastic.

17. The optical assembly of claim 1, further comprising an elongated optical element mounted forward of said pair of lamp brackets.

18. The optical assembly of claim 17, wherein said elongated optical element includes a central aperture, and wherein said elongated optical element is oriented to allow light to pass optically undisturbed through said central aperture toward said imager.

19. The optical assembly of claim 18, wherein said elongated optical element further includes a lens element disposed on at least one side of said central aperture.

20. An optical assembly for use in an optical reader, said optical assembly comprising:
   a support frame;
   a receive optical axis;
   a pair of lamp brackets disposed at either side of said frame, each lamp bracket including a platform carrying a pair of LED clips and a field stop including a front wall and an elongated horizontal rectangular aperture;
   a pair of LEDs mounted in said LED clips of said each lamp bracket, wherein body portions of said pair of LEDs of said each bracket define inner and outer LED boundary lines, and said LEDs are disposed so that LED boundary lines of said each lamp bracket extend through said field stop; and
   a cylindrical lens surface disposed forward of said each field stop, said cylindrical lens surface imaging said each field stop onto a target; and
   an imager assembly of the type comprising an imager and a support, said imager assembly disposed on said support frame and oriented perpendicular to said receive optical axis.

21. The optical assembly of claim 20, wherein said optical assembly further includes an imaging lens assembly, wherein said support frame includes a rear housing containing said imager assembly, wherein said support frame further includes wall-shaped arms integrally formed with said rear housing and extending forwardly from said rear housing, and wherein said optical assembly is received between said wall-shaped arms.

22. The optical assembly of claim 20, wherein said support frame includes a back wall, said back wall having spaced apart receiving surfaces receiving outer regions of a back surface of said support of said imager assembly.

23. The optical assembly of claim 20, further comprising a single piece optical element including at least one of said cylindrical lens surfaces imaging said field stops onto a target, said optical element having a center aperture centered on said receive optical axis.

24. The optical assembly of claim 20, wherein said receive optical axis is unfolded.

25. An optical assembly for use in an optical reader having a receive optical axis, said optical assembly comprising:
 a support frame having a rear housing containing a solid state imager assembly of the type comprising an imager, a support, and a series of leads, wherein said rear housing includes a back surface receiving said imager assembly;
 first and second light units disposed on either side of said receive optical axis;
 first and second field stops, wherein said first field stop is disposed optically forwardly of said first light unit, and wherein said second field stop is disposed optically forward of said second light unit; and
 a single piece optical element received on said support frame disposed to image said first and second field stops onto a target, said single piece optical element having a center aperture centered on said receive optical axis.

26. The optical assembly of claim 25, wherein said support frame further includes a pair of wall-shaped arms integrally formed with said rear housing and extending forwardly from said rear housing.

27. The optical assembly of 25, wherein said first and second field stops include respective first and second elongated horizontal apertures, wherein each light unit includes a pair of LEDs, and wherein LED boundary lines defined by body portions of said each pair of LEDs extended through said respective first and second apertures.

28. The optical assembly of claim 25, wherein said receive optical axis is unfolded.

29. An optical assembly for use in an optical reader, said optical assembly comprising:
 an imager assembly including an imager;
 a receive optical axis extending perpendicularly from said imager;
 first and second light units disposed on either side of said receive optical axis;
 first and second field stops, wherein said first field stop is disposed optically forward of said first light unit, and wherein said second field stop is disposed optically forward of said second light unit;
 at least one optical element disposed to image light from said at least one of said first and second field stops onto a target, wherein said at least one optical element has formed thereon at least one single axis diffuser homogenizing light in a horizontal plane, said at least one single axis diffuser having a variable diffractive coefficient and an aperture aligned with said imager assembly such that light passes optically undisturbed from the target barcode to said imager assembly; and
 a support frame supporting at least one of said imager assembly and said optical element.

30. The optical assembly of claim 29, wherein said at least one optical element is a single piece member imaging each of said respective field stops onto a target, and aperture extends through said single piece member along said receive optical axis.

31. The optical assembly of claim 29, wherein said at least one optical element imaging said first and second field stops onto said target and includes first and second single axis diffuser surfaces, each single axis diffuser surface homogenizing light from one of said light units in a horizontal plane and having a variable diffractive coefficient and including a percentage of diffusion greater at an inner edge thereof than an outer edge.

32. The optical assembly of claim 29, wherein said first and second field stops include respective first and second elongated horizontal apertures, wherein each light unit includes a pair of LEDs, and wherein LED boundary lines defined by body portions of said each pair of LEDs extend through said respective first and second apertures.

33. The optical assembly of claim 29, wherein said receive optical axis is unfolded.

* * * * *